April 23, 1940.　　　G. J. OLNEY　　　2,198,390
VEGETABLE CLEANER AND SEPARATOR
Filed April 26, 1938　　　4 Sheets-Sheet 2

INVENTOR
George J. Olney
BY Martin & Rendell
ATTORNEYS

April 23, 1940.　　　　　G. J. OLNEY　　　　　2,198,390
VEGETABLE CLEANER AND SEPARATOR
Filed April 26, 1938　　　4 Sheets-Sheet 3
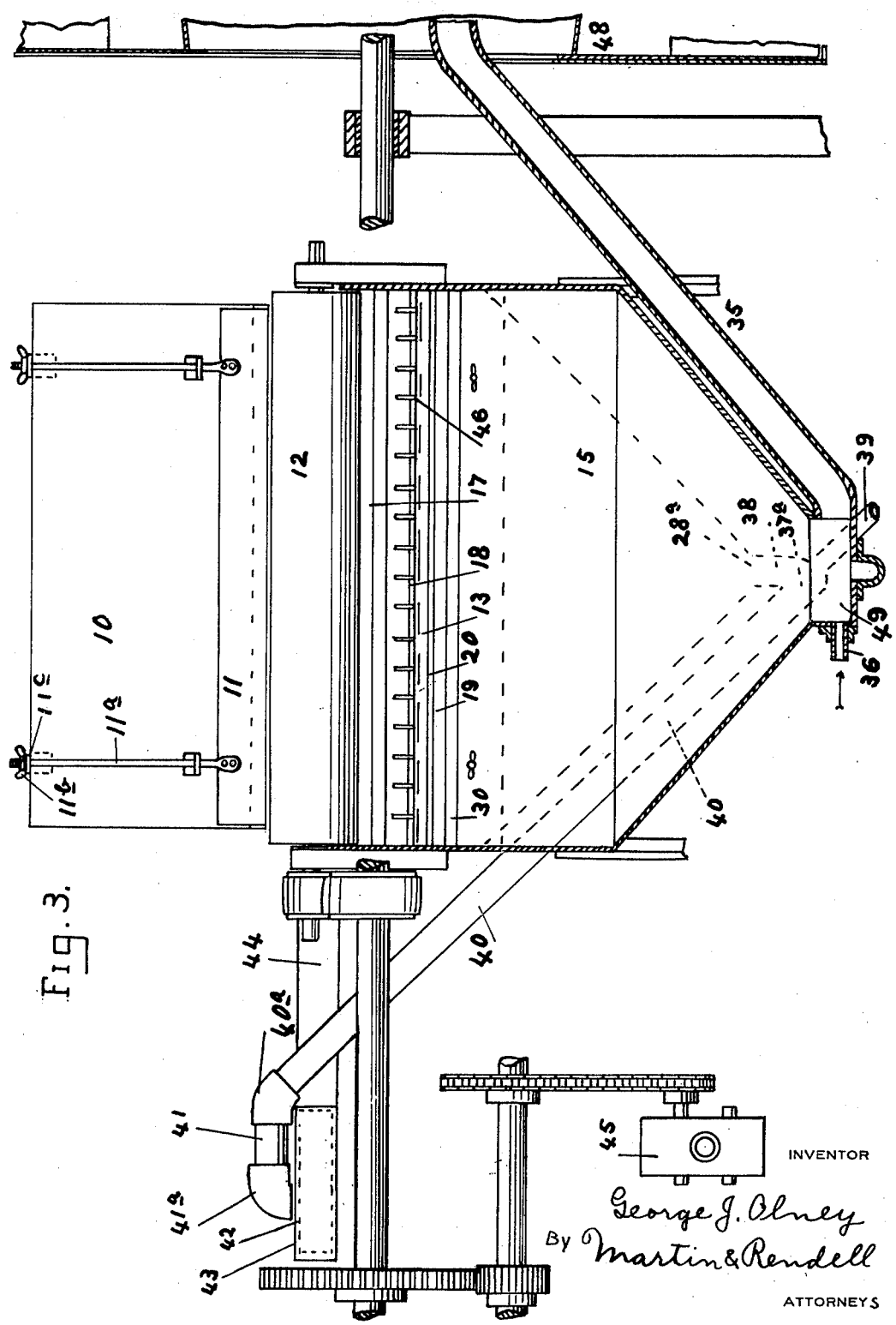

April 23, 1940.   G. J. OLNEY   2,198,390
VEGETABLE CLEANER AND SEPARATOR
Filed April 26, 1938   4 Sheets-Sheet 4

INVENTOR
George J. Olney
BY Martin & Rendell
ATTORNEYS

Patented Apr. 23, 1940

2,198,390

UNITED STATES PATENT OFFICE 2,198,390

VEGETABLE CLEANER AND SEPARATOR

George J. Olney, Westernville, N. Y.

Application April 26, 1938, Serial No. 204,368

8 Claims. (Cl. 209—173)

My present invention relates to a vegetable cleaner and separator.

The purpose of this invention is to provide a vegetable separator and cleaner of new and improved construction and of wide adaptability and increased efficiency. A further purpose is to provide a device of the class described using water or other liquid as the basis of separating stones, gravel and other heavy material from the vegetables, such as peas or beans, carried in said water and tending to sink therein slower than the heavier stones or other foreign material, said water or other liquid furthermore being made the vehicle in said machine to separate light foreign material such as leaves, pods and sticks of peas or beans from the vegetables themselves, due to such foreign matter hereinafter called trash positively floating at the surface of the liquid.

Further purposes are to provide various constructions and combinations of the parts of the machine which will enable the machine to be used on a considerable variety of vegetables but which will allow of very close adjustment of the machine to separate on the one hand the heavy foreign material from the good vegetables and on the other hand to separate the good vegetables from the trash; a further purpose is to provide in a machine of the class described mechanism for closely adjusting either or both separation operations according as the kind or character of the vegetable demands relative to the foreign material and also relative to the trash or light material. Further purposes and advantages of the invention will appear from the specification and claims herein.

Fig. 3 is a vertical sectional view on a similarly enlarged scale of the machine on line 3—3 of Fig. 1.

Figure 1:
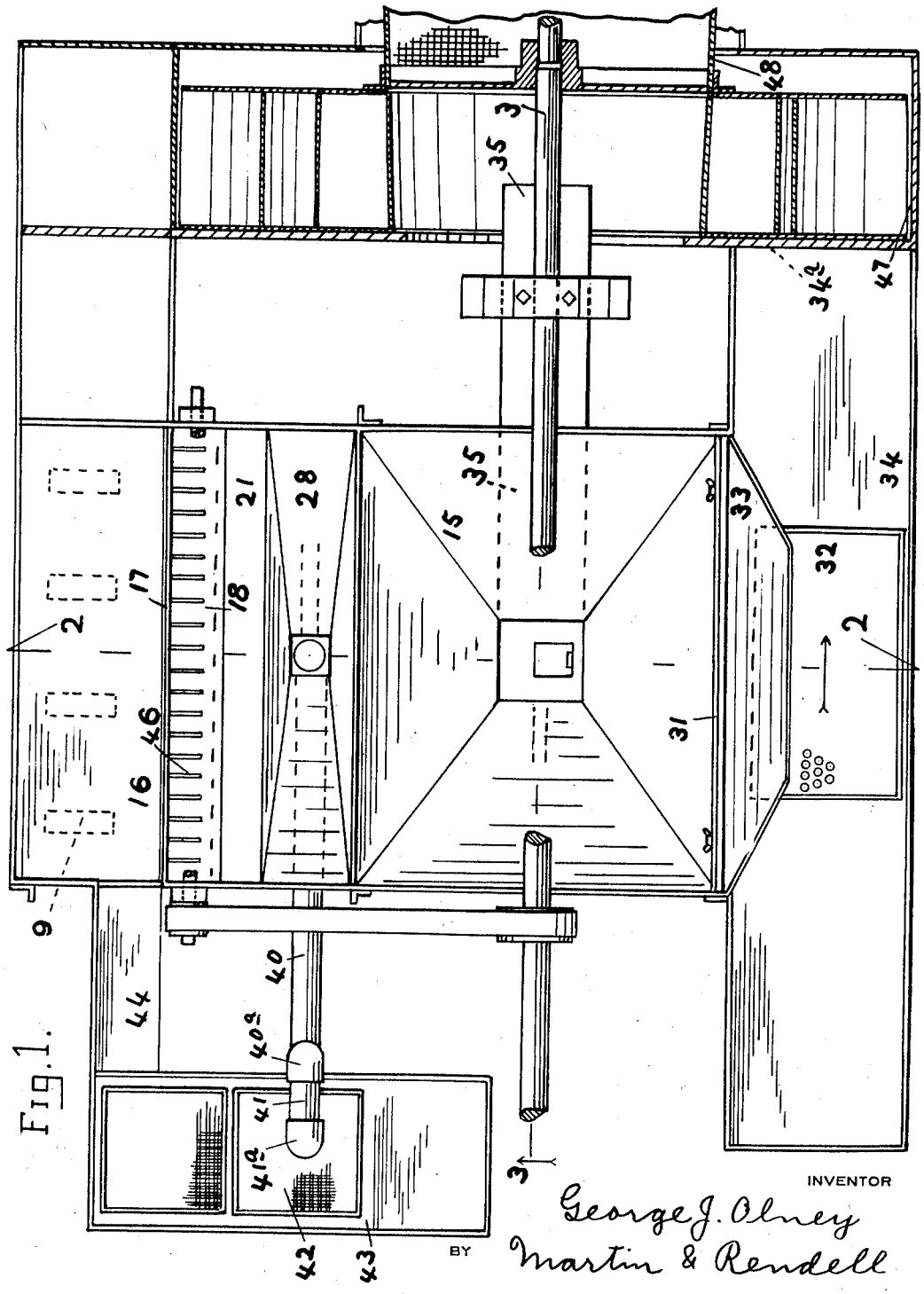
Fig. 1 is a top or plan view of a machine embodying this invention, but with the hopper, feed roll and slanting platform of the stone-settling tank removed and with the water-raising paddle wheel and part of the circular screen shown in section.
Figure 2:
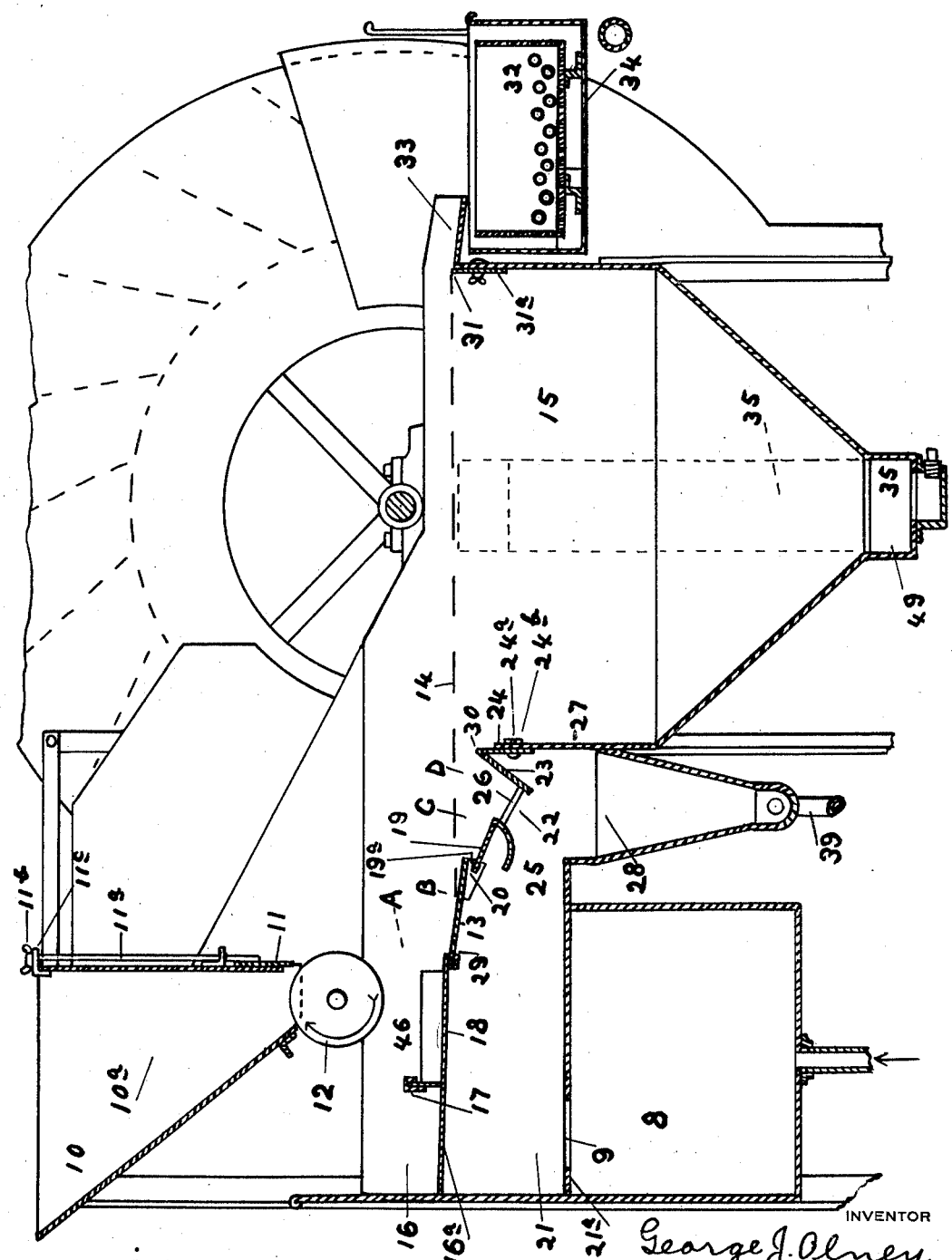
Fig. 2 is a vertical sectional view on a slightly enlarged scale on line 2—2 of Fig. 1, and extending lengthwise of the main course of travel of the water and vegetables through the water-using and gravity-operating separator mechanism proper which forms the essential subject matter of this invention.

Referring to the drawings in a more particular description and first to Figs. 1–4 it will be understood that the peas or beans or other vegetables in a more or less dry state are put into the hopper 10 which appears most plainly in the upper left hand part of Fig. 2. As the machine is arranged the said hopper 10 has its left hand wall slanting downwardly and to the right while its opposite wall is substantially vertical. The right and left hand walls of said hopper are connected at their extremities to the ends 10$^a$. The right hand side of said hopper is provided at its lower end with an adjustable gate 11 adapted to be raised or lowered substantially in line with the said right hand wall by means of two spaced rods 11$^a$, the upper threaded ends of which are provided with thumb nuts 11$^b$ resting upon outwardly projecting brackets 11$^c$ and adapted in obvious manner to be turned one way or the other to raise or lower the gate 11 relative to the opposite smooth-surfaced feed wheel 12. This is suitably rotatably mounted at its opposite ends and extends the whole length of the opening at the bottom of the hopper 10. The said feed wheel as the machine is here organized rotates in a clockwise direction and tends to carry the required quantity of the vegetables to the right below the lower end of the adjustable gate 11 and allow the vegetables and the accompanying heavy foreign matter and light trash to be dropped through zone A into the water in the part of the machine immediately therebelow. The top or general water level of the water is indicated by the long dash line 14. This water at zone A is flowing slowly to the right over the first slanting plate 13 where the vegetables and the accompanying foreign matter both heavy and light fall into the water from the right hand side of feed wheel 12. From this point the water flows slowly towards the right and at about the middle of plate 13 meets the general water level and thereafter flows to and over a second slanting plate 19 and across the large outlet 22 (leading down into the preliminary or stone settling tank 28) and still further to the right across the top of the main settling tank 15. The water flowing over the first slanting plate 13 comes across from a much less steeply inclined plate 18, from over the top of an adjustable but normally fixed strip 17 which controls the outlet from the upper water supply compartment 16. The source of supply of water to this tank 16 from passage 44 from the stone separator will be described hereafter.

The lefthand edge of the slanting plate 13 is supported by a practically water-tight but loose joint 29 provided at the right hand edge of the slightly sloping plate 18. At the right hand edge of plate 13 the second slanting plate 19 extends for a short distance below the adjacent edge of plate 13 but spaced slightly therefrom so as to provide an outlet 20 for water to pass to the right between these two plates from the water chamber 21 which extends, as plainly shown in Fig. 2, to the left below the plates 13 and 18 and below the bottom 16ª of compartment 16. The bottom 21ª of water chamber 21 is provided with several spaced openings 9 through which the water comes up from the larger water supply compartment 8. The source of supply of water to this compartment will be described hereafter. The water coming from this lower water supply compartment 8 through water chamber 21 provides the water for the first outlet 20 and also for the second outlet 22 already mentioned as being to the right of the second slanting plate 19.

This second slanting plate 19 is preferably formed integral with a guide plate 25 which projects downwardly and to the left from the right hand edge of plate 19 with the lower and left hand half of said guide plate 25 coming to a position substantially parallel with plate 19. From this guide plate 25 there extends thin rigid connectors 26 which have their other ends rigidly fastened to the left hand slanting wing 23 which projects downwardly from the top of vertically extending adjustable plate 24 mounted upon the upper portion of the wall 27 which may conveniently form the partition between the main settling tank 15 and the adjacent or right hand side of the stone settling tank 28. A series of suitable bolts and thumb nuts 24ª and 24ᵇ connecting plate 24 and wall 27 form convenient means for adjusting as needed and holding not only the plate 24 but also the parts connected thereto. It will be seen from what has been already said that raising the adjustable plate 24 will carry upward therewith the slanting wing 23 carried thereby and the rigid connectors 26 extending across the outlet 22 and in turn carrying at their left hand and upper ends the guide plate 25 to which is rigidly connected the second slanting plate 19. Narrow lugs or other spacers 19ª projecting upward from the left hand end of plate 19 to the lower surface of the right hand edge of the first slanting plate 13 will obviously swing the right hand end of said plate 13 upwardly as the adjustable plate 24 is raised. Obviously the lowering of said plate 24 will allow wing 23, guide plate 25 and second slanting plate 19 to descend bodily therewith and incidentally allow the right hand end of the first slanting plate 13 to swing downwardly in its loose joint 29.

Preferably the connection between the adjustable plate 24 and its wing 23 is made as a rounding edge 30 as by making a rounding bend in the piece of sheet metal from which the slanting wing 23 and the plate 24 are integrally formed.

It will be understood that the different receptacles or chambers and the passageways already mentioned are suitably formed of proper sheet metal of suitable character and formed as by bending or joining the edges in ways common to such water-using and gravity-operating separators so that the details thereof need not be further described.

The preliminary or stone-settling tank 28 of which a cross-sectional view is shown in Fig. 2 at its upper part connects for a considerable height to the water chamber 21 to the left. Below the level of the bottom 21ª of water chamber 21 the stone-settling chamber 28 is of elongated rectangular form as shown in Fig. 1 for some distance downwardly, but its lower portion, that is both its sides and its ends, taper inwardly and downwardly as indicated in Figs. 1, 2 and 3, so as to form a funnel leading to its centrally located bottom aperture 28ª, which is connected to one branch 38 of an ejector 37. This branch 38 extends downwardly and to the left as seen in Fig. 3 into the main slanting chamber 37ª of the ejector, which as seen in Fig. 3 slants upwardly and to the left. To the lower end of this main chamber is connected the incoming pipe 39 and to the upper and left hand end of the ejector is connected the larger outlet pipe 40. A constant and sufficient supply of water under proper pressure as from a pump 45 is supplied to the pipe 39 so that stones, gravel and other heavy foreign material with a certain part of the water in the stone-settling chamber 28, settle downwardly through said chamber 28, through its aperture 28ª and the branch 38 into the main chamber 37ª of the ejector and are carried upwardly through the larger outlet pipe 40. This outlet pipe 40 extends upwardly to the left as seen in Figs. 3 and 1 and closely follows the adjacent slanting end of the chamber 28. The upper end of this pipe 40 is connected to a 45° angle elbow 40ª, the other end of which is connected to a short horizontal pipe 41 to the outer end of which pipe there is preferably fastened a down-turned elbow 41ª so that the water and material coming through said pipe and these connections are delivered downwardly into either one of several perforated-wall receptacles 42 placed in a tank 43 as best shown at the left hand side of Figs. 1 and 3. As one of these stone-collecting receptacles gets nearly full it is moved out of the tank 43 and another receptacle is placed under the elbow 41ª. From the farther end (as seen in Fig. 1) of this relatively raised tank 43 the water flows to the right through the passageway 44 to provide water for chamber 16 already mentioned as being located underneath the hopper 10 and providing the water to go over the adjustable but normally fixed strip 17.

Figure 4:
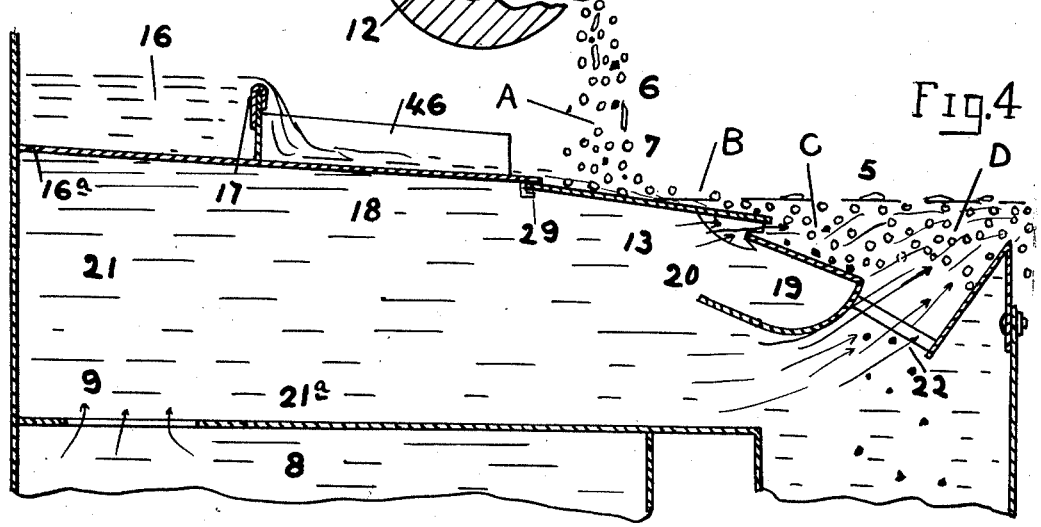
Fig. 4 is a detailed enlarged sectional view corresponding to the left hand portion of Fig. 2 but showing only the part adjacent the water level or closely therebelow.

The water, largely from the rotating screen handling the cleaned vegetables, supplied under slight pressure to the closed lower water compartment 8, passes upwardly through several spaced openings 9 in the left hand part of the top of this compartment which is largely the same as the bottom 21ª of the water chamber 21. These openings 9 are spaced as far to the left as practicable as seen in Fig. 2 and are spaced apart over the whole width of the bottom 21ª as shown in dotted lines in Fig. 1, so as to prevent any decided local currents in the water chamber 21 and so as to simply get a slow uniform movement to the right hand part of the water in said chamber 21. It results from this that the water in chamber 21 tends to slowly move to the right through the first outlet 20 already mentioned as located between the overlapping slanting plate 13 and the second slanting plate 19. Also this general slight movement of the water to the right from chamber 21 will result in a slow movement up through the large outlet 22 between the guide plate 25 and the slanting wing 23. In the enlarged sectional view Fig. 4 the peas or other vegetables 7 are represented by rather regular circular outlines while the stones or other heavy material 6 are represented by more or less irregular black dots. It will be understood that this whole Fig. 4 is somewhat diagrammatic in its representation of the flow of water and of the presence and number of the vegetables and stones and light matter. The water from the upper water supply compartment 16 flows over the adjustable but normally fixed strip 17 in a thin evenly distributed stream of water so as to get a steady well-distributed flow of water to the right across the slightly slanting plate 18. In order to prevent any cross-currents on plate 18 there there are located longitudinally thereof a number of thin upstanding partitions 46. This water then passes from the right hand end of plate 18 to the slightly more slanting plate 13. At xx about the middle of the length of the plate 13 the vegetables and foreign matter both heavy and light fall through the zone A thereabove from the right hand side of the said roller 12 into the water above the plate 13. From here on the mechanism is such as to gradually bring about a separation of the good vegetables which tend to sink slowly in water, from the heavier foreign matter which tends to sink more rapidly in water. The direct gravity action of these materials in water however has to be modified by nicely regulated but relatively slow currents of water so that the good vegetables that are only slightly heavier than water will be prevented from diving or temporarily going lower at the different stages of the machine than is proper in order to bring about an ultimate separation of the good vegetables from the stones and other heavy material. On the other hand there has to be a sufficient body of water and a sufficient space provided for the materials, both vegetables and trash and heavy materials, so that mixed groups of any of these materials will be allowed to break up and so that good peas that come in temporarily adhering to a stone will not be carried down with the stone and wasted. On the other hand there must be sufficient agitation and shock and water supply to separate small stones from good peas so that such heavy foreign matter will not be carried along with the good peas or other vegetables. The presence of a little grit or of a few pieces of very fine stones with the ultimate canned vegetables would very much reduce the quality and lower the grade of such vegetables.

As the vegetables with their mixed foreign materials both light and heavy are passing to the right over the second half of plate 13 and through zone B as indicated on Figs. 2 and 4, and carried in the water that has come through from between the partitions 46 on plate 18, the mixture meets the left hand end of the water level 14 extending to the left from the main separator tank 15 and from the stone settling tank 28. The vegetables in the flowing water passing to the right get a slight mixing or churning action as they meet the near end of the much more slowly moving or almost stationary zone of water. This operates to break up any masses of peas or mixtures of peas and foreign matter stuck together and this action is further emphasized by the water passing out through the first outlet 20 from beneath the right hand end of plate 13. This slight new supply of water with a slight current produces another stage of activity at zone C over the second slanting plate 19. At this zone the general movement is toward the right but very slowly and the movement of water from outlet 20 has tended to slightly churn up the whole body of water and its contents so as to further retard and delay the sinking of the good vegetables in the water and to cause such good vegetables to occupy the intermediate vertical space in the water notwithstanding the fact that such good vegetables are slightly heavier than the water. In this zone C, that is in the space over the slanting plate 19, the stones and other foreign material which are decidedly heavier than water sink in the water and slide along the upper surface of said plate 19. The trash and other light material is definitely floating along on the top surface of the water. The good vegetables being, as already suggested, only slightly heavier than water are ultimately carried over the second outlet 22 to and over the rounding edge 30 at the meeting of the upper parts xxx of the slanting wing 23 and the adjustable plate 24. For convenience this space over the large outlet 22 and extending to the edge 30 is designated in two views of the drawings as zone D. In this zone the stones and other heavy material having come to the lower or right hand end of slanting plate 19 continue their movement to the right and fall downward through said opening 22 notwithstanding the slight upward movement through said opening of water from the water chamber 21. Such downward movement of the stones and heavy foreign matter continues even after some of the stones reach the lower part of said slanting wing 23; they will continue their general downward movement by sliding down said slanting wing, and keep on dropping through the preliminary or stone-settling tank 28, and will ultimately reach the lower outlet or aperture 28ª therefrom and pass by branch 38 into the main chamber of the ejector 37 already described and be carried up through the outlet pipe 40 from said ejector and deposited in one of the receptacles 42.

The general movement onward of the good vegetables suspended throughout almost all the middle portion of the water in zone C and carried over into zone D operates to carry the good vegetables over the dividing edge 30 and out into the main settling tank 15. The movement to the right of the water in zone C and especially in zone D operates to hold the good vegetables suspended and to carry them over the dividing edge 30 notwithstanding that the vegetables are slightly heavier than the water in which they are suspended. As shown in the diagrammatic view Fig. 4 the slow but decidedly upward movement of water through the outlet 22 operates to swing the good vegetables slightly upward so that they will go over said edge 30. Even if some of the vegetables strike the slanting plate 23 they will be pushed up said plate and over the dividing edge 30 and so on into the main settling tank 15. The upward movement of water through outlet 22 is not sufficiently violent to prevent any stones settling therethrough that have been carried part way across the opening and even against the slanting wing 23.

There has now been passed to the right into the main settling tank 15 the light floating trash and also the good vegetables which are slightly heavier than the water but which up to now have been prevented from sinking. In the main settling tank 15 full opportunity is afforded to the good vegetables to sink in said tank. This tank is relatively wide from left to right as viewed in Fig. 2, so that as the general movement of the water especially towards the top of the tank is towards the right the good vegetables will slowly sink in the tank while the light trash will all come to the top or to the water level in said tank and will slowly pass over the upper edge 31 of an adjustable gate 31ª provided and adjustably fastened at the right hand side of said main tank 15 as seen in Fig. 2. This gate 31ª gives access for the water and trash to go into a chute 33 the bottom of which extends to the right and downwardly and conducts the floating light material and a considerable body of water coming over the edge 31 into any one of several receptacles 32 suitably held in place in a relatively long passage 34. The receptacles 32 have perforated ends, sides and bottoms and so form a screen which holds the light material in the receptacle but allows the water to drain therefrom. This passage 34 extends to the right as seen in Fig. 1 and at its right hand end the water escapes through an outlet 34ª downwardly into a tank 47 which is low enough down to receive the water from the rotating screen 48, only the left hand end of which is shown in Fig. 1, but which is of conventional form, being slightly tapered so as to receive at its smaller left hand end as seen in Fig. 1 the good vegetables and a considerable supply of water from the upper end of the wide closed-sided and closed-topped chute 35. The slight incline in the bottom of the rotating screen 48 operates to convey the vegetables toward the right through the right hand open end of the screen into suitable containers not shown, while meantime the water escapes through the bottom part of the rotating screen 48 into an extension of the tank 47.

The good vegetables slowly settle to the bottom in the main settling tank 15, the slanting sides and ends of which direct the said vegetables into the centrally located pocket 49. From the right hand side of said pocket as seen in Fig. 3 there extends upwardly on a slant the closed chute 35 having its upper end extending into the near and small end of the said rotating screen 48. The upper end of this chute has its lower surface on a level appreciably below the water level 14 of the main settling tank 15 and this placing of the outlet of chute 35 at a lower level than the water level in the main tank operates to cause a constant upward movement of water from the bottom of the main tank 15 up through the said inclined chute 35. This upward current of water under ordinary operation of the machine carries the good vegetables from the bottom of tank 15 upwardly through chute 35 and out over the upper end of said chute into the near end of the rotating screen 48. If however the machine is working with a heavy load of vegetables being separated it may then be necessary to utilize an ejector 36 which is attached to the left hand end of the pocket 49 as the parts are seen in Fig. 3. The addition of a small stream of water under considerable force across this pocket and directed into the lower end of the slanting chute 35 will add enough power to the current of water passing from the bottom of the main tank 15 upwardly through said chute to carry this heavier load of vegetables.

It will be understood that this machine has to be adjusted in certain respects according to the quality and character and particularly according to the quantity or bulk of vegetables being handled by the machine in a given time. Assuming that say 200 pounds of peas a minute is the full capacity of the machine and it has been set to properly work at that capacity; then if the machine is for any appreciable length of time being fed less than that quantity, the total substance, meaning total of peas and water going through the machine, decreases. The water level then automatically drops because the lesser quantity of peas fails to keep the water up to the proper level and the water level would automatically drop and no water would go over the top edge 31 of gate 31ª. Accordingly no light trash would be separated and that material would gather at the top of the main tank and would soon spread out over the said main tank and interfere with the proper operation of the machine. Accordingly the gate 31ª would be lowered to get some water to pass to the right over this gate and thus carry therewith the light trash. Now if the machine again be loaded to its full capacity of 240 pounds of peas per minute the added peas by their own bulk would raise the water level and too much water would go out over gate 31ª and would carry some very light peas out with the trash. Accordingly the said gate 31ª should be again raised to its former position or to what was found to be a proper position with the added quantity of peas being fed to the machine so as to allow the trash to be floated over said gate, but still allow the gate to be up far enough to prevent too great a current over the gate and to prevent good vegetables suspended close to the water level from going out with the trash.

Experience with certain varieties of peas such as the "Thomas Laxton" variety of peas has shown the desirability of a modified style of gate at the outlet from the main separating tank and also the advisability of preliminary vertically arranged baffle plates before that gate is reached. The Thomas Laxton variety of peas is very much lighter than the usual variety so that these peas tend to float for a much longer time close to the water level in the main separating tank. In the operation of the machine as shown in Figs. 1 to 4 peas that are floating an inch or possibly three-fourths of an inch below the surface of the water will strike the vertical gate 31ª and roll up the surface of the gate and go over the top edge 31 with the trash.

Figure 5:
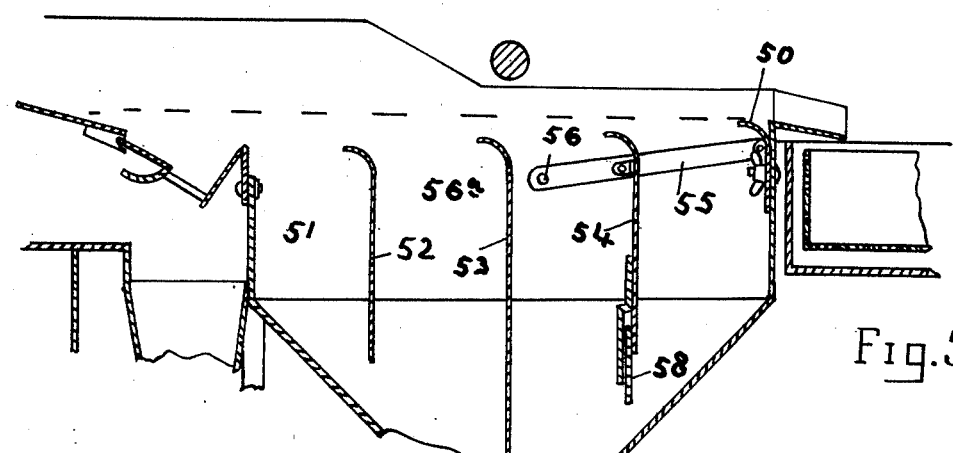
Fig. 5 is a vertical cross-sectional view similar to Fig. 2 but of only the stone-settling tank and the main separating tank and showing a modified form of the machine.

In Fig. 5 I have shown a modification, the first part of which includes providing the main separating tank 51 with a gate 50 at its right hand side but with said gate having its upper portion curved back toward the main separating tank 51. Since under working conditions of this separating machine only about one-eighth to one-fourth of an inch of water is being carried over the gate 50 the curved or concave upper part of the gate will deflect practically all of these very light "undecided" peas to go downwardly in the tank with the other good peas instead of going over the gate with the floating trash. To still further assist in handling these very light peas which tend to float close to the top I have provided in the main separating tank 51 as shown in Fig. 5 a set of, say three, baffle plates 52, 53 and 54, numbered from the left across the said tank. These baffle plates are arranged in a general vertical position but each has a small part of its length at the top curved to the left. These operate to deflect downwardly any peas that are floating just below the surface of the water and so start them on their way straight down through the said main separating tank. Preferably the left hand baffle plate 52 will be the lowest and the next or middle baffle plate 53 will have its upper end a little higher than the plate 52. The third baffle plate 54 is mounted to be adjustable vertically according as the gate 50 may have to be adjusted up or down. This is accomplished by providing at each end of the gate 50 a lever 55 pivoted at its right hand end to said gate and at its left hand end at point 56 to the ends 56ᵃ of said tank 51. Intermediate its ends these levers are pivoted to an ear projecting at right angles from the adjacent ends of the last baffle plate 54. If now the gate 50 has to be lowered the adjacent baffle plate 54 is carried down proportionately but slightly less so as to still keep the upper end of the last baffle plate 54 below the level of the water as established by the upper end of gate 50. It will be seen of course that all of the baffle plates stop before the opposing lower surface of the tank 51 is reached so as to give opportunity for the down settling vegetables to move toward the pocket at the bottom of the funnel-shaped tank from which they are carried upwardly through the slanting chute as already described for the main machine. So that the downward travel of peas beyond the last baffle plate 54 will not be interfered with and so that the movement of water across the main settling tank will not be interfered with I make the movable baffle plate 54 appreciably shorter relative to the subjacent portion of the tank and then have a permanently mounted short baffle plate 58 fastened in place so that it overlaps the lower portion of plate 54 and extends toward the bottom of the tank the required distance. This prevents an undue lowering of the movable plate 54 from cutting off the outlet for vegetables to pass downwardly from the compartment in the tank beyond the movable baffle plate.

Figure 6:
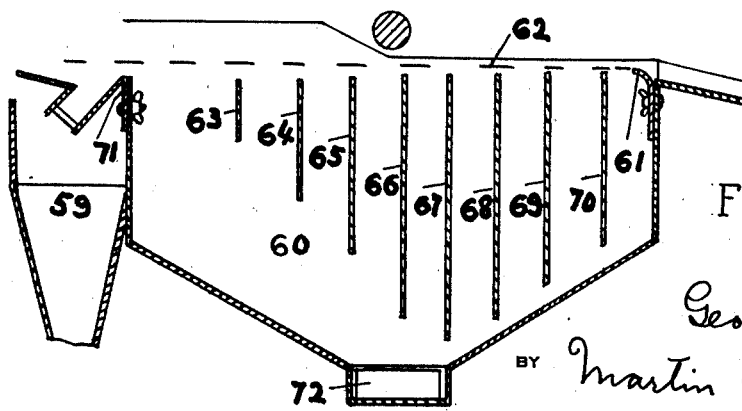
Fig. 6 is a view similar to Fig. 5 but showing a further modification of the machine.

In Fig. 6 there is shown in vertical section similar to Fig. 5 the stone-settling tank 59 and main settling tank 60 of a modified form of my machine especially adapted for operation with peas or other very light vegetables which are so close to the specific gravity of water that the vegetables or some of them at least float almost indefinitely in water. It will be seen that this presents a problem in providing facilities or mechanism to separate as great a proportion as possible of these very light vegetables which are floating very close to the surface of the water from the trash which is floating at the surface of the water.

The gate 61 at the horizontal outlet on the right hand side of the main settling tank 60 is preferably similar to the corresponding gate in Fig. 5 in that its upper portion is curved back toward the left, forming a concave face on the side toward the oncoming water and material at or close to the water level 62. Arranged through the tank 60 as it extends from left to right is a series of say eight vertically arranged baffle plates designated respectively by the numerals 63, 64, 65, 66, 67, 68, 69 and 70. These baffle plates in the main are spaced about an equal distance away from each other and away from the gate 61, except that the first plate, 63, is considerably farther than such space from the gate 71 that marks the division between the stone-settling tank 59 and the main separating tank 60. The upper edge of the first plate 63 is a considerable distance below the water level and the successive baffle plates thereafter have their upper edges gradually farther up so as to be successively closer to the water level. As the general movement of water is toward the right and carries therewith not only the floating trash at the top of the water but a considerable body of vegetables just below the water level, these baffle plates will successively arrest and turn downward the vegetables suspended in the water. It will be seen that the first baffle plate 63 will intercept the considerable body of vegetables that are some distance below the surface of the water and as there is also a general downward movement of water throughout the whole extent of the tank the vegetables that strike the first plate 63 will be deflected and drawn downward toward the outlet pocket 72 at the bottom of the main settling tank 60. Vegetables that are a little closer to the water level would go over the first baffle plate but may be intercepted by the second baffle plate which is a little higher than the first or would be intercepted by the successive slightly raised following baffle plates. Toward the outlet gate 61 the baffle plates are purposely arranged so close to the water level 62 as to successively catch any very light vegetables that are floating even very closely to the water level. These baffle plates however, being just below the water level, still allow the water at the top of the tank to pass to the right and carry therewith the floating trash to and over the upper edge of the gate 61. Even at this gate the inwardly curved upper edge of the gate 61 may catch and turn back some vegetables that were floating too close to the water level to be caught even by the last and most upwardly-positioned baffle plate 69.

I have mentioned that the first baffle plate 63 in this modified form of my machine is spaced some considerable distance from the inlet side of the tank 60. The provision of this added space is so that a very considerable body of the heavier of the vegetables being separated may have an opportunity to sink in this space and pass below the relatively shallow first plate 63. It will be understood that the variation in specific gravity between vegetables of the same general class being sorted at one time may be quite great. A very considerable part will go downwardly even before the first baffle plate is reached, or at the first or second baffle plate, and provision is thus made by giving a considerable clear space between the first baffle plate and the inlet side of the tank. For the same reason and so that ample provision may be allowed for these relatively heavier articles to settle downwardly the first baffle plate 63 is relatively narrow and its lower edge is spaced a long way from the opposing portion of the bottom of the tank. The second baffle plate 64 is wider but still its lower edge is spaced a considerable distance from the bottom of the tank. The third baffle plate 65 is still wider but its length is still such as to leave a clear passage-way for the vegetables to pass toward the outlet pocket 72 without striking the lower end of said plate. The fourth plate 66 as shown in said Fig. 6 as this machine is organized, is about over the middle of the outlet pocket 72 and the lower edge of said plate is farther down toward the outlet. It will thus be seen that vegetables that are heavy enough to begin sinking before the first plate is reached will have a large clear passageway in a downwardly slanting direction to the outlet pocket 72. This passageway will be followed by a large percentage of most of the lot of vegetables being separated. The numerous baffle plates of this modification are arranged to successively sort out more and more of the very light vegetables that would otherwise be lost by going out with the floating trash. The successive baffle plates 67, 68, 69, and 70 are made successively narrower vertically so that their lower ends will still be spaced some distance from the upwardly slanting surface of the bottom of this portion of the tank so that there will always be a passage for vegetables that have been arrested by these baffle plates or even by the gate 61 to settle downward toward the outlet pocket 72.

What I claim as new and desire to secure by Letters Patent is:

1. In a vegetable cleaner and separator of the water using type, the combination of a main vegetable-seperating tank having an inlet at one end for the vegetables, lighter floatable trash and water and having at its top at its opposite end an outlet for some water and said floatable trash, and having at its bottom an outlet for the vegetables and some water, and a plurality of spaced upright baffle plates arranged transversely of the tank with their lower edges spaced from the bottom of the tank and with their entire upper edges terminating below the water level in the tank but progressively coming nearer the water level as the said plates approach the said upper outlet whereby separation is effected by said baffle plates at progressively higher zones as the said upper outlet is approached.

2. In a vegetable cleaner and separator of the water-using type, the combination of a main vegetable-separating tank having an inlet at one end for the vegetables, lighter floatable trash and water and having at its top at its opposite end an outlet for some water and said floatable trash, and having at its bottom an outlet for the vegetables and some water, and a plurality of spaced, upright baffle plates arranged transversely of the tank with their lower edges spaced from the bottom of the tank and with their upper edges terminating below the water level in the tank and inclined towards the inlet to a progressively greater extent as the plates approach their upper edges.

3. In a vegetable cleaner and separator of the water-using type, the combination of a main vegetable-separating tank having an inlet at one end for the vegetables, lighter floatable trash and water and having at its top at its opposite end an outlet for some water and said floatable trash, and having at its bottom an outlet for the vegetables and some water, a vertically adjustable gate at the said top outlet, an upright, transversely extending baffle plate spaced back from said upper outlet gate and having its upper portion vertically adjustable to various heights below the water level in said tank, the lower edge of said baffle plate being spaced up from the part of the bottom of the tank therebelow and means co-operatively connecting said gate and the adjustable upper portion of said baffle plate for simultaneous adjustment of said gate and baffle plate.

4. In a vegetable cleaner and separator of the water-using type, the combination of a main vegetable-separating tank having an inlet at one end for the vegetables, lighter floatable trash and water and having at its top at its opposite end an outlet for some water and said floatable trash, and having at its bottom an outlet for the vegetables and some water, a vertically adjustable gate at the said top outlet, an upright, transversely extending baffle plate spaced back from said upper outlet gate and having its upper portion vertically adjustable to various heights below the water level in said tank, the lower edge of said baffle plate being spaced up from the part of the bottom of the tank therebelow and means co-operatively connecting said gate and the adjustable upper portion of said baffle plate for simultaneous adjustment of said gate and baffle plate, the upper portion of said baffle plate and the upper portion of said top outlet gate being inclined towards the inlet.

5. In combination, a separating tank having an outlet at its bottom and an outlet at the upper part of one side, a water-carrying platform at the opposite side of said tank and having downwardly slanting portions terminating below the water level of said tank, said platform including an upper, fixed, slightly slanting portion, a second portion adjoining thereto and swingingly mounted at its end adjacent the fixed portion and a third portion having its inner end spaced down from the outer end of said swinging portion and pivotally connected thereto, means for adjusting said third portion bodily in a vertical direction and thereby adjusting the slant of said second portion, a water chamber immediately below said platform and opening out to the tank for the width of the platform, means to supply water to the upper end of said platform, means to supply material to said platform and means to supply water to the chamber below the platform back from the tank.

6. In combination, a separating tank having an outlet at its bottom and an outlet at the upper part of one side, a vertically adjustable gate at said upper outlet, a water-carrying platform at the opposite side of said tank and having downwardly slanting portions terminating below the water level of said tank, said platform including an upper, fixed, slightly slanting portion, a second portion adjoining thereto and swingingly mounted at its end adjacent the fixed portion and a third portion having its inner end spaced down from the outer end of said swinging portion and pivotally connected thereto, means rigidly connecting said gate and said third portion of the platform whereby adjustment of said gate moves the said third portion bodily vertically and swings the second portion, a water chamber immediately below said platform and opening out to the tank for the width of the platform, means to supply water to the upper end of said platform, means to supply material to said platform and means to supply water to the chamber below the platform back from the tank.

7. In combination, a separating tank having an outlet at its bottom and an outlet at the upper part of one side, a vertically adjustable gate at said upper outlet having a wing slanting from its upper edge down into said tank, a water-carrying platform at the opposite side of said tank and having downwardly slanting portions terminating below the water level of said tank, said platform including an upper, fixed, slightly slanting portion, a second portion adjoining thereto and swingingly mounted at its end adjacent the fixed portion and a third portion having its inner end spaced down from the outer end of said swinging portion and pivotally connected thereto, means rigidly connecting said wing and said third portion of the platform whereby adjustment of said gate moves the said third portion bodily vertically and swings the second portion, a water chamber immediately below said platform and opening out to the tank for the width of the platform, means to supply water to the upper end of said platform, means to supply material to said platform and means to supply water to the chamber below the platform back from the tank.

8. In combination, a separating tank having an outlet at its bottom and an outlet at the upper part of one side, a water-carrying platform in three successive transversely arranged sections slanting continuously downwardly into the opposite side of said tank, a water chamber immediately below the first and second sections of said platform and opening out to the tank for the width of the platform, the second section of said platform having its lower end in said tank below the water level therein and the third section of said platform being in said tank with its upper end below and spaced downwardly from the lower end of the second section and forming a preliminary outlet for the water to pass through said platform in a nearly horizontal direction while the space beyond the other end of the third section of the platform forms the main outlet for the water from said chamber to pass upwardly in a slanting direction, means to supply water to the upper side of the upper end of said platform, means to supply material to the upper part of said platform and means to supply water to the chamber below the platform back from the tank.

GEORGE J. OLNEY.